United States Patent [19]
Weiser

[11] Patent Number: 6,053,794
[45] Date of Patent: Apr. 25, 2000

[54] ADJUSTABLE DEER CALL

[75] Inventor: Mark J. Weiser, Evans City, Pa.

[73] Assignee: Outland Sports, Inc., Neosho, Mo.

[21] Appl. No.: 09/351,361

[22] Filed: Jul. 12, 1999

[51] Int. Cl.[7] .................................................. A63H 5/00
[52] U.S. Cl. ........................................... 446/207; 496/208
[58] Field of Search .................................. 446/207, 208, 446/397, 404, 408, 416; 84/383 K

[56] References Cited

U.S. PATENT DOCUMENTS

| | | | |
|---|---|---|---|
| 726,277 | 4/1903 | Fuller | 446/208 |
| 1,484,148 | 2/1924 | Olt | 446/208 |
| 3,020,675 | 2/1962 | Boecker | 446/208 |
| 3,029,554 | 4/1962 | Mobley | 446/207 X |
| 3,579,903 | 5/1971 | Stewart | 446/208 |
| 4,143,485 | 3/1979 | Stewart | 446/207 |
| 4,850,925 | 7/1989 | Ady . | |
| 4,940,451 | 7/1990 | Leady . | |
| 5,577,946 | 11/1996 | Oathout . | |
| 5,643,039 | 7/1997 | McIntyre . | |

*Primary Examiner*—Sam Rimell
*Attorney, Agent, or Firm*—Shook, Hardy & Bacon L.L.P.

[57] ABSTRACT

A method and apparatus for calling wildlife using a reed contact to deflect the free end of a vibrating reed to vary the tone produced the reed.

5 Claims, 2 Drawing Sheets

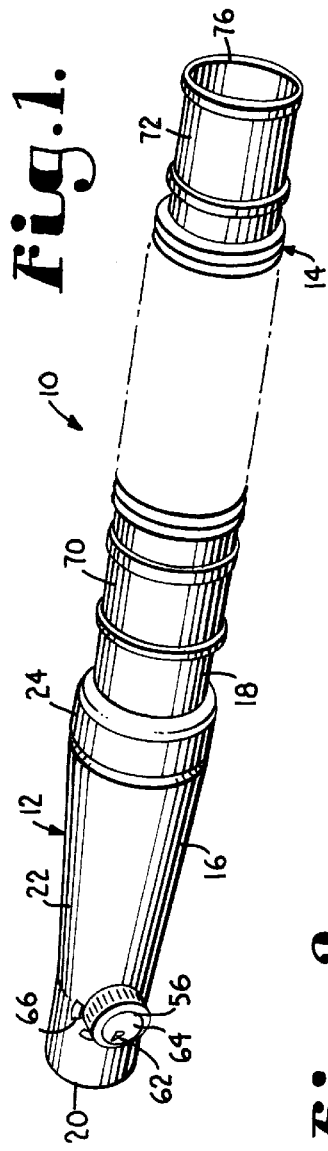
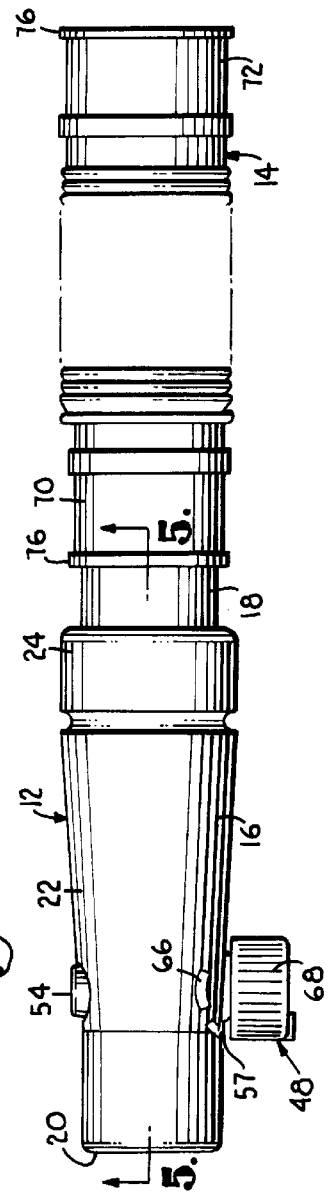
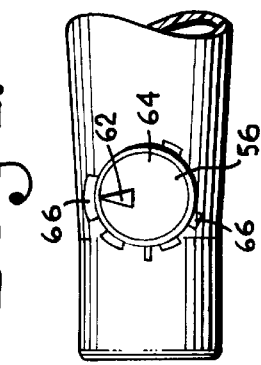
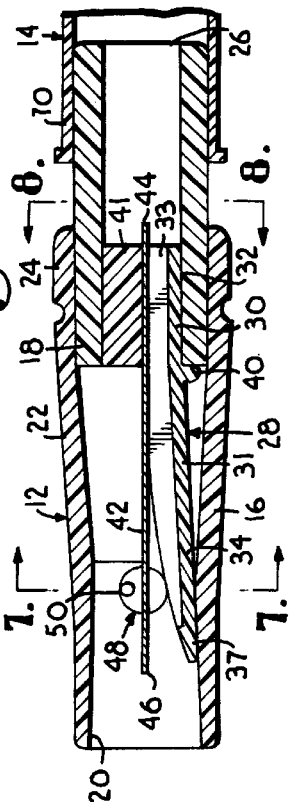

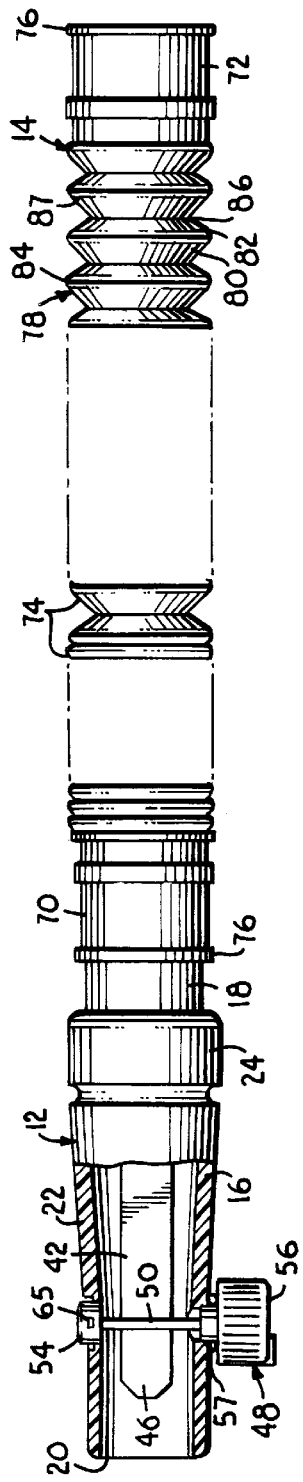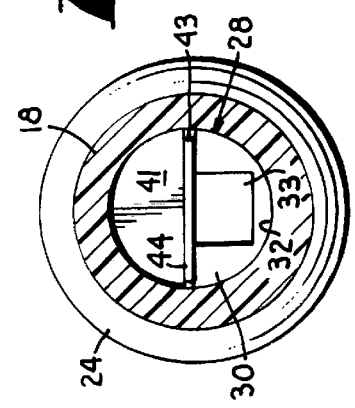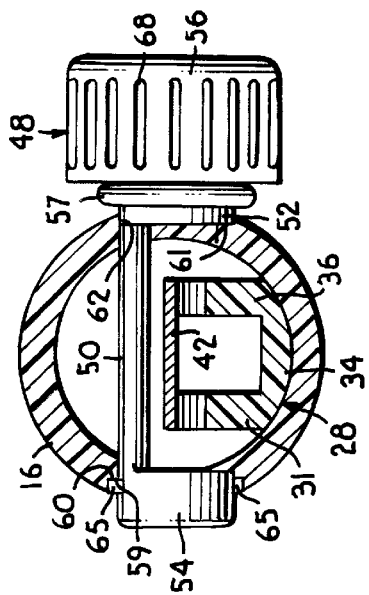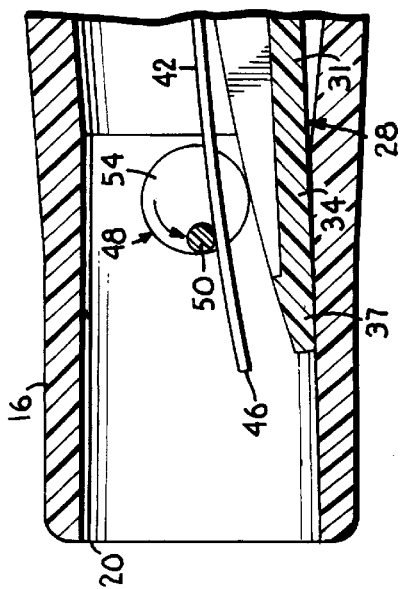

ADJUSTABLE DEER CALL

CROSS-REFERENCE TO RELATED APPLICATIONS

Not Applicable.

STATEMENT REGARDING FEDERALLY SPONSORED RESEARCH OR DEVELOPMENT

Not Applicable.

The present invention is disclosed in Disclosure Document 438568 dated Jun. 8, 1998.

BACKGROUND OF THE INVENTION

This invention relates to a device and method for calling wildlife and, more particularly, to a device which emulates a variety of sounds produced by deer.

Deer hunters typically employ a number of methods for calling a deer within range to be shot by a rifle, bow, or other weapon. Typically, the sounds are produced by calls having a reed placed within a longitudinal passage. The hunter forces air from the hunter's lungs through the passage and the reed vibrates to produce a tone emulating a deer sound.

For instance, U.S. Pat. No. 4,850,925 to Ady discloses a double band reed mounted between two venturi bars formed on opposing shells. The hunter places the device between his lips and forces air across the reed to emulate a deer sound. The device is effective for producing a particular deer sound without requiring a great deal of skill from the user. However, the device is ineffective for producing a wide variety of different sounds that may be used to attract deer.

The prior art also includes calls capable of producing more than one deer sound. Generally, in these devices, flexible, elongated reeds are mounted within a tubular mouthpiece. Using various structures, pressure is applied at one of a plurality of points along the length of the elongated reed to vary the effective vibrating length of the reed. Since the effective vibrating length of the reed determines the tone produced when air is forced over the reed, varying this dimension causes various sounds to be produced.

For instance, U.S. Pat. No. 5,577,946 to Oathout discloses a call with an elastic skin positioned on the tubular member near to the reed. The user depresses the elastic skin at one of several positions to contact the reed. Likewise, U.S. Pat. No. 4,940,451 to Leady discloses a slidable tuning member that is selectively positionable on the reed to vary the effective length and the sound produced by the reed. U.S. Pat. No. 5,643,039 to McIntyre discloses a plurality of interchangeable tuning clips that place pressure at various points along the length of the reed. Other prior art devices utilize O-rings securing the reed to an underlying reed holder. To change the sound produced by the reed, the call is disassembled and the O-ring is slid along the length of the reed holder to vary the effective length of the reed.

While the prior art calls are capable of producing a number of deer sounds, none allow the hunter to quickly and accurately change the tone produced by simply turning an adjustment dial from one position to another. Also, none of the prior art calls control the tone produced by physically limiting the amplitude that the reed may vibrate. Finally, the prior art calls are not capable of producing the full range of sounds produced by male and female deer.

Therefore, a wildlife call is needed which overcomes the deficiencies of the prior art calls discussed above.

OBJECTS OF THE INVENTION

Accordingly, an object of the present invention is to provide a call with a reed contact that limits movement of the reed between the contact and a reed holder to vary the amplitude of the vibratory reed.

A further object of the present invention is to provide a call with an adjustable dial that is rotated to vary the sound produced by the call.

Still another object of the present invention is to provide a deer call that produces a variety of deer sounds by deflecting the reed to vary the sound produced by the call.

A further object of the present invention is to provide a device that produces the full continuum of varying sounds produced by male and female deer.

Another object of the present invention is to provide a call that allows the hunter to quickly and accurately switch between different sounds produced by a deer.

A further object of the present invention is to provide a method of calling wildlife by moving the reed contact with respect to the reed to limit movement of the reed between the contact and a reed holder.

DESCRIPTION OF THE SEVERAL VIEWS OF THE DRAWING

The objects and features of the invention noted above are explained in more detail with reference to the preferred embodiment illustrated in the attached drawing figures, in which like reference numerals denote like elements, and in which:

FIG. 1 is a perspective view of a deer call.

FIG. 2 is top plan view of a deer call.

FIG. 3 is a fragmentary top plan view of a deer call with portions broken away to show the reed and reed contact assembly of the invention.

FIG. 4 is a partial side view of the inlet of the mouthpiece and adjustable dial of the present invention.

FIG. 5 is a vertical cross sectional view taken along line 5—5 of FIG. 2.

FIG. 6 is an enlarged, vertical cross sectional view of the mouthpiece showing the pin deflecting the reed.

FIG. 7 is a vertical cross sectional view taken along line 7—7 of FIG. 5.

FIG. 8 is a vertical cross sectional view taken along line 8—8 of FIG. 5.

DETAILED DESCRIPTION OF THE INVENTION

Referring to the drawings in greater detail, and initially to FIGS. 1, 2 and 5, a wildlife call generally designated by numeral 10 is shown. Call 10 has a mouthpiece 12 and a sound tube 14 secured to one end of the mouthpiece.

The mouthpiece 12 is formed from a first barrel 16 and a second barrel 18. In the preferred embodiment, the first barrel 16 and second barrel 18 are made from a plastic material and integrally molded to one another. The first barrel 16 includes an inlet 20, a tapered section 22, and a sleeve 24 for receipt of the second barrel 18. The second barrel 18 extends from first barrel 16 and terminates at an outlet 26. Alternatively, the two barrels may be distinct from one another and frictionally secured such as by an interference fit between the two barrels.

With reference to FIGS. 5 and 8, a reed holder 28 having a base 30 and an air flow channel 31 is located within the mouthpiece 12. The base 30 begins at the end of the second barrel 18 opposite the outlet 26. The bottom wall 32 of base 30 has a circular curve and forms an air tight connection with the bottom half of second barrel 18. The top of base 30 is generally flat except for a rectangular passageway 33 formed along the length of the base.

The air flow channel 31 extends from the edges of rectangular passageway 33 of base 30 and into first barrel 16 in the direction of inlet 20. Channel 31 is defined by a bottom 34 and opposing sidewalls 36 formed at right angles with the bottom. The channel 31 is angled downwardly from the base 30 until bottom 34 engages the bottom interior wall of first barrel 16. As best shown in FIG. 5, the height of sidewalls 36 decreases as the air flow channel 31 extends toward inlet 20, and terminates at an end 37. The cross sectional profile of the sidewalls is arcuate and generally concave downwardly. On the underside of air flow channel 31, a stop 40 engages the end of second barrel 18 to prevent the reed holder 28 from sliding into the second barrel.

A thin, flexible reed 42 overlies the top of base 30 at a fixed end 44. The reed is preferably formed from a thin plastic or MYLAR material. A solid plug 41 is placed over the fixed end 44 and in abutment with the upper surface of base 30. As best shown in FIGS. 5 and 7, the plug 41 has a generally semi-circular cross section and is roughly the same length as base 30. The plug 41 is placed in tight connection with the upper half of second barrel 18 and base 30 to firmly hold the fixed end 44 of the reed. Both reed holder 28 and plug 41 are preferably produced from an injection molded plastic.

The reed 42 extends toward inlet 20 in adjacent relation with air flow channel 31 and terminates at a free end 46. Preferably, the free end 46 is a small distance from the inlet end of the mouthpiece so that the flow of air from the user's mouth can be directed in the elongate direction before reaching the reed. Also, the distance prevents the user's mouth from physically contacting the reed.

Thus, when the base 30 of reed holder 28 and plug 41 are placed within mouthpiece 12, a majority of air flowing throughout the mouthpiece is directed through passageway 33. However, a small amount of air may flow between the reed 42 and the sidewalls of second barrel 18 at small spaces 43 without adversely affecting the performance of the call.

With reference to FIG. 7, a reed contact assembly 48 is positioned within mouthpiece 12 near the intersection of tapered portion 22 and inlet 20. Assembly 48 comprises a pin 50, a first hub 52, a second hub 54, and an adjustable dial 56. The small cylindrical pin 50 is mounted between opposing hubs 52 and 54 at an equal distance from the center of each hub. Each hub is formed from a solid plastic disc. With reference to FIG. 3, hubs 52 and 54 are rotatably secured at hub receiving apertures 58 and 60 on opposing sides of the mouthpiece 12. The periphery of first hub 52 contacts a ledge 61 formed near the surface of hub receiving aperture 58. The second hub 54 includes small nubs 65 that contact a similar ledge 59 formed within hub receiving aperture 60. Thus, the reed contact assembly 48 is rotatably secured between the opposing hub receiving apertures 58 and 60.

Adjustable dial 56 extends from first hub 52 and is located outside the walls of mouthpiece 12. A series of notches 68 are placed on the cylindrical sidewall of dial 56 so that the knob is easy to grasp. A band 57 is located between first hub 52 and dial 56. The reed contact assembly 48 is preferably molded from the same plastic material as mouthpiece 12.

An arrow indicator 62 is placed on the circular face 64 of dial 56 to indicate the angular position of pin 50 within mouthpiece 12. A plurality of sound type markings 66 are placed on the outer surface of the mouthpiece 12 at positions surrounding the circumference of dial 56. As the adjustable dial 56 is turned, the arrow indicator 62 is aligned with the sound type marking 66 corresponding to the sound that the call is configured to produce.

The pin 50 of reed contact assembly 48 is movable to a number of positions with respect to reed 42. With reference to FIGS. 5 and 7, when the arrow indicator 62 on dial 56 is in the vertical position, a space is defined between reed 42 and the contact pin 50. When the dial 56 is rotated in the counterclockwise direction, the pin moves toward the reed 42 along the radius of rotation.

As best shown in FIG. 4, as the dial 56 is further rotated, reed contact pin 50 begins to deflect the free end 46 of reed 42. As the pin 50 deflects the free end of the reed, the shape of the reed begins to mimic the arcuate shape of the sidewalls 36 of air flow channel 31. Moreover, the space between the reed 42 and the air flow channel leading to passageway 33 becomes decreasingly smaller. When the pin deflects the free end of the reed into near contact with the reed holder 28, a small slit is formed between the free end 46 of the reed and the end 37 of the air flow channel. When the dial 56 is set in the desired position, the friction between the opposing hubs 52 and 54 and the hub receiving apertures 58 and 60 prevents the forces created by the deflected free end of the reed from displacing the pin from the position desired by the user.

The sound tube 14 has a pair of opposing sleeves 70 and 72 at either end and a number of foldable segments 74 located therebetween. Preferably, the sleeves are inwardly tapered to provide a firm interference fit with the outlet 26 of mouthpiece 12. An end band 76 is located at the end of each sleeve.

With reference to FIG. 3, the foldable segments 74 of sound tube 14 are shown. In the unfolded position, each unfolded segment 78 has a width defined by the combined width of a first section 80 and a second section 82. A fold 84 is located along the circumferential intersection of first section 80 and the second section 82. In the folded position, the first section 87 of the next adjacent segment is matingly received within the second section 82 as the second section 82 folds at the intersection 86 of the two sections and into section 80. The second sleeve 72 may be pulled from or pushed toward the first sleeve 70 to vary the number of segments in the folded and unfolded positions to vary the length of the tube.

In operation, the user first extends or retracts the sound tube 14 to the desired length. Then, the user rotates the dial 56 so that the arrow indicator 62 is aligned with the sound type marking 66 indicating the desired sound. Resultingly, the pin 50 is moved to the desired distance from reed 42 or to deflect the free end 46 of the reed to the desired angle of deflection. Next, the user forces air over the reed 42 by either blowing at inlet 20 or pulling air through outlet 26. Air flows generally between reed 42 and air flow channel 31 and finally through the passageway 33. As air passes through the mouthpiece 12, the reed 42 vibrates between the reed contact pin 50 and the sidewalls 36 of channel 31. Thus, the vibration of the free end 46 of reed 42 is bounded by the reed contact pin 50 when the pin is set at a distance from the reed 42 or when the pin is deflecting the reed 42. The vibration of the reed 42 is also affected by the decreasing area between the reed 42 and the channel 38. As the area decreases, the velocity of the air flowing over the reed 42 similarly increases. Thus, when the free end 46 is deflected into proximity with channel 31, the rapidly flowing air and minimal amplitude of the vibrating reed causes a higher pitched animal sound to be produced. Conversely, as the distance between the reed 42 and the air flow channel 31 increases, the amplitude of a reed increases and a progressively deeper tone is produced.

The call 10 of the present invention is capable of producing a wide variety of animal sounds having various tones. The call is particularly useful for producing the full range of male and female deer sounds. Also, the call allows a continuum of sounds to be produced in an effective manner and allows the user to switch from one sound to another quickly and effectively. For instance, when the pin 50 is at the furthest distance from reed 42 and the sound tube 14 is extended to between its half to full length, the present invention is capable of producing sounds closely emulating those produced by dominate bucks since the reed 42 is allowed to deflect a relatively large distance and a deep tone is produced. To produce the sounds of younger bucks, the tube length is shortened and the pin is moved to within a small distance from the reed 42. When the pin 50 is at a horizontal position and barely in contact with the reed 42 and the sound tube 14 is generally extended, the sound produced by the call closely simulates that of a buck bawl. As best seen in FIG. 6, when the reed contact pin partially deflects the reed, and the sound tube is retracted to a short length, the call is capable of producing a hot doe bleat sound. Moreover, when the reed is further deflected from its initial position, and is placed in close proximity with the sidewalls of the pin, a fawn distress sound may be emulated. Finally, when the pin is in direct engagement and firmly securing the reed to the sidewalls of the reed holder, the sound of a young deer bleat is produced.

Various routines involving the use of different types, durations, and inflections of sounds are known to lure deer. These routines are easy to learn and reproduce by using the call of the present invention. The rotatable reed contact assembly is particularly effective for switching from one call sound to another, and is capable of producing an infinite number of call sounds.

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A game call comprising:

an elongated mouthpiece having an inlet and an outlet;

a reed disposed within and coupled with said mouthpiece, said reed having a free end; and a reed contact coupled with said mouthpiece and movable to change the deflection angle of said free end of said reed wherein said reed contact comprises a pin extending transversely of said reed and a hub rotatably coupled with said mouthpiece, said hub having a center and being coupled with said pin at a distance from said center, whereby air passes over and vibrates the reed when a user forces air from said inlet to said outlet to simulate an animal sound and movement of said reed contact changes the tone of the sound to simulate various other sounds produced by the animal.

2. The game call of claim 1 wherein said reed contact further comprises a dial coupled with said hub and having a portion outside said mouthpiece wherein a user can grasp said dial to rotate said hub.

3. A deer call comprising:

an elongated mouthpiece having an inlet and an outlet;

a reed holder disposed within and coupled with said mouthpiece, said reed holder having a bottom and a pair of opposing sidewalls joined to said bottom to define an elongated air flow channel, said opposing side walls decreasing in height as said reed holder extends in the direction of said inlet;

a plug coupled with a portion of said reed holder to define a passageway between said inlet and said outlet;

a reed having a fixed end and a free end, said fixed end of said reed coupled between said reed holder and said plug, said reed extending along said slot opposite said bottom and terminating at a free end, and a reed contact coupled with said mouthpiece and movable to deflect said free end of said reed, said reed contact comprising a pin extending transversely of said reed and a hub rotatably coupled with said mouthpiece, said hub having a center and being coupled with one end of said pin at a distance from said center of said hub whereby rotation of said hub moves said pin with respect to said reed to change the distance between said pin and said sidewalls of said reed holder, whereby air passes over and vibrates said reed to simulate an animal sound when a user forces air from said inlet to said outlet and movement of said hub changes the tone of the sound to simulate various deer sounds.

4. The game call of claim 3 further comprising a sound tube coupled with said outlet.

5. The game call of claim 4 wherein said sound tube is extendable and retractable to vary its length and thereby vary the sound produced by the call when a user blows through said inlet.

* * * * *